US008103499B2

(12) United States Patent
Lai et al.

(10) Patent No.: US 8,103,499 B2
(45) Date of Patent: Jan. 24, 2012

(54) DISAMBIGUATION OF TELEPHONE STYLE KEY PRESSES TO YIELD CHINESE TEXT USING SEGMENTATION AND SELECTIVE SHIFTING

(75) Inventors: Jenny Huang-Yu Lai, Seattle, WA (US); Jianchao Wu, Sammamish, WA (US)

(73) Assignee: Tegic Communications, Inc., Seattle, WA (US)

( * ) Notice: Subject to any disclaimer, the term of this patent is extended or adjusted under 35 U.S.C. 154(b) by 981 days.

(21) Appl. No.: 12/050,840

(22) Filed: Mar. 18, 2008

(65) Prior Publication Data

US 2008/0235003 A1 Sep. 25, 2008

Related U.S. Application Data

(60) Provisional application No. 60/896,464, filed on Mar. 22, 2007.

(51) Int. Cl.
*G06F 17/28* (2006.01)

(52) U.S. Cl. ............. 704/4; 704/2; 704/3; 704/7; 704/8; 704/9; 345/168; 345/171; 715/262; 715/263; 715/264; 715/265

(58) Field of Classification Search .................. 704/2–9; 715/262–265; 345/168, 171
See application file for complete search history.

(56) References Cited

U.S. PATENT DOCUMENTS

| 5,109,352 | A | | 4/1992 | O'Dell | |
|---|---|---|---|---|---|
| 5,175,803 | A | * | 12/1992 | Yeh | ................................ 715/234 |
| 5,952,942 | A | * | 9/1999 | Balakrishnan et al. | ......... 341/20 |
| 6,009,444 | A | | 12/1999 | Chen | |
| 6,054,941 | A | | 4/2000 | Chen | |
| 6,104,317 | A | | 8/2000 | Panagrossi | |
| 6,169,538 | B1 | | 1/2001 | Nowlan et al. | |
| 6,172,625 | B1 | | 1/2001 | Jin et al. | |
| 6,204,848 | B1 | | 3/2001 | Nowlan et al. | |
| 6,711,290 | B2 | | 10/2001 | Sparr et al. | |
| 6,362,752 | B1 | | 3/2002 | Guo et al. | |
| 6,424,743 | B1 | | 7/2002 | Ebrahimi | |
| 6,502,118 | B1 | | 12/2002 | Chatterjee | |
| 6,686,852 | B1 | | 2/2004 | Guo | |
| 6,757,544 | B2 | | 6/2004 | Rangarajan et al. | |
| 6,801,659 | B1 | * | 10/2004 | O'Dell | ......................... 382/185 |

(Continued)

FOREIGN PATENT DOCUMENTS

WO WO 2006097052 A1 * 9/2006

*Primary Examiner* — David R Hudspeth
*Assistant Examiner* — Lamont Spooner
(74) *Attorney, Agent, or Firm* — Michael A. Glenn; Glenn Patent Group

(57) ABSTRACT

To enter Chinese text, a user enters the corresponding phonetic spelling via telephone style keypad. Some or all keys represent multiple phonetic letters. In disambiguating entered key presses to yield a valid phonetic spelling, a computer divides the key presses into segments, while still preserving key press order. Each segment must correspond to an entry in a dictionary of Chinese characters, character phrases, and/or character components such as radicals or other predetermined stroke groupings. Upon arrival of a new key press that cannot form a valid entry when appended to the current segment, key presses are incrementally reallocated from the previous segment. As for already-resolved segments occurring prior to the previous and current segments, these are left intact. After each shifting attempt, the computer reinterprets key presses of the last two segments, and accepts the new segmentation if the segments form valid dictionary entries.

14 Claims, 20 Drawing Sheets

U.S. PATENT DOCUMENTS

| | | |
|---|---|---|
| 6,807,529 B2 | 10/2004 | Johnson et al. |
| 6,864,809 B2 | 3/2005 | O'Dell et al. |
| 6,912,581 B2 | 6/2005 | Johnson et al. |
| 6,947,771 B2 | 9/2005 | Guo et al. |
| 6,955,602 B2 | 10/2005 | Williams |
| 6,956,968 B1 | 10/2005 | O'Dell et al. |
| 6,973,332 B2 * | 12/2005 | Mirkin et al. ............... 455/566 |
| 6,982,658 B2 | 1/2006 | Guo |
| 7,057,607 B2 | 6/2006 | Mayoraz et al. |
| 7,075,520 B2 | 7/2006 | Williams |
| 7,095,403 B2 | 8/2006 | Lyustin et al. |
| 7,139,430 B2 | 11/2006 | Sparr et al. |
| 7,256,769 B2 * | 8/2007 | Pun et al. ...................... 345/171 |
| 7,257,528 B1 | 8/2007 | Ritchie et al. |
| 7,272,564 B2 | 9/2007 | Phillips et al. |
| 7,313,277 B2 | 12/2007 | Morwing et al. |
| 7,349,576 B2 | 3/2008 | Holtsberg |
| 7,389,235 B2 | 6/2008 | Dvorak |
| 7,437,001 B2 | 10/2008 | Morwing et al. |
| 7,466,859 B2 | 12/2008 | Chang et al. |
| 2003/0023426 A1 * | 1/2003 | Pun et al. ...................... 704/9 |
| 2003/0054830 A1 | 3/2003 | Williams et al. |
| 2003/0144830 A1 | 7/2003 | Williams |
| 2003/0233615 A1 * | 12/2003 | Morimoto et al. ......... 715/501.1 |
| 2004/0006455 A1 * | 1/2004 | Fux et al. ...................... 704/4 |
| 2004/0153963 A1 | 8/2004 | Simpson et al. |
| 2004/0153975 A1 | 8/2004 | Williams et al. |
| 2005/0027524 A1 | 2/2005 | Wu et al. |
| 2005/0027534 A1 * | 2/2005 | Meurs et al. ................. 704/270 |
| 2005/0114770 A1 | 5/2005 | Sacher et al. |
| 2005/0268231 A1 * | 12/2005 | Wen et al. ..................... 715/534 |
| 2005/0283358 A1 * | 12/2005 | Stephanick et al. .............. 704/7 |
| 2006/0129928 A1 | 6/2006 | Qiu |
| 2006/0136408 A1 | 6/2006 | Weir et al. |
| 2006/0155536 A1 | 7/2006 | Williams et al. |
| 2006/0158436 A1 | 7/2006 | LaPointe et al. |
| 2006/0173807 A1 | 8/2006 | Weir et al. |
| 2006/0193519 A1 | 8/2006 | Sternby |
| 2006/0236239 A1 | 10/2006 | Simpson et al. |
| 2006/0239560 A1 | 10/2006 | Sternby |
| 2007/0094718 A1 | 4/2007 | Simpson |
| 2007/0168175 A1 * | 7/2007 | Fux et al. ........................... 704/3 |
| 2007/0168176 A1 * | 7/2007 | Fux et al. ........................... 704/3 |
| 2007/0168177 A1 * | 7/2007 | Fux et al. ........................... 704/3 |
| 2007/0168178 A1 * | 7/2007 | Fux et al. ........................... 704/3 |
| 2007/0203879 A1 | 8/2007 | Templeton-Steadman et al. |
| 2007/0239425 A1 * | 10/2007 | Fux ................................... 704/3 |
| 2007/0239426 A1 * | 10/2007 | Fux et al. ........................... 704/3 |
| 2007/0239427 A1 * | 10/2007 | Fux et al. ........................... 704/3 |
| 2007/0276814 A1 | 11/2007 | Williams |
| 2007/0285397 A1 | 12/2007 | LaPointe et al. |
| 2008/0130996 A1 | 6/2008 | Sternby |
| 2010/0146386 A1 * | 6/2010 | Ma et al. ........................ 715/261 |
| 2010/0174529 A1 * | 7/2010 | Bradford et al. ................ 704/10 |

* cited by examiner

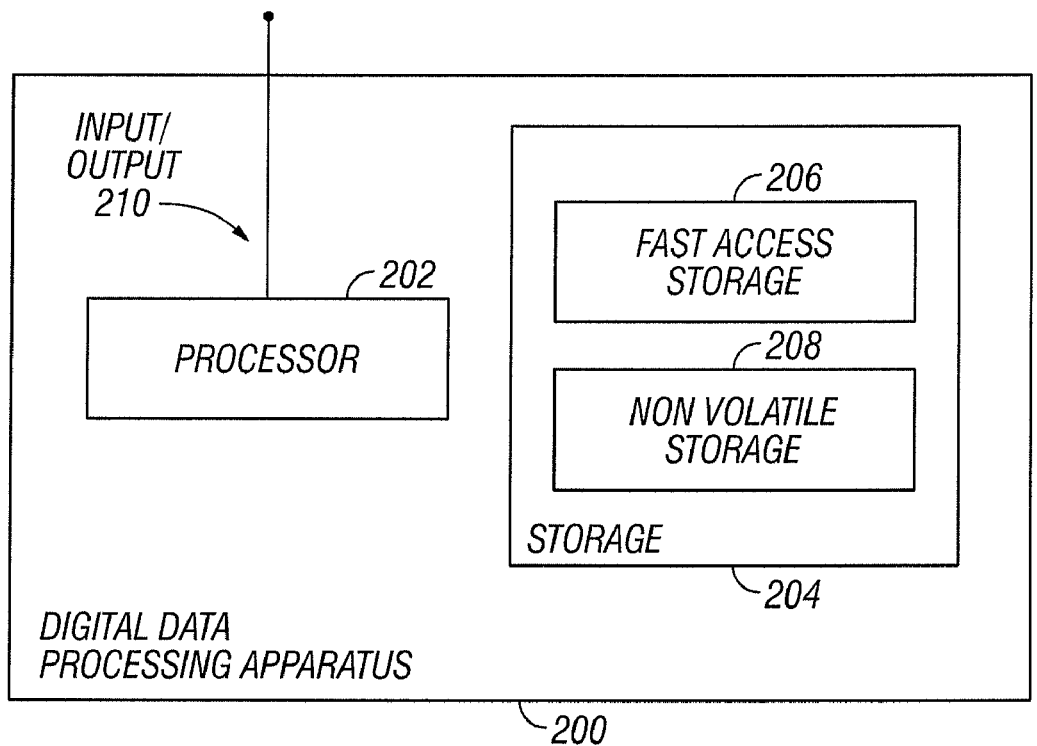
FIG. 2
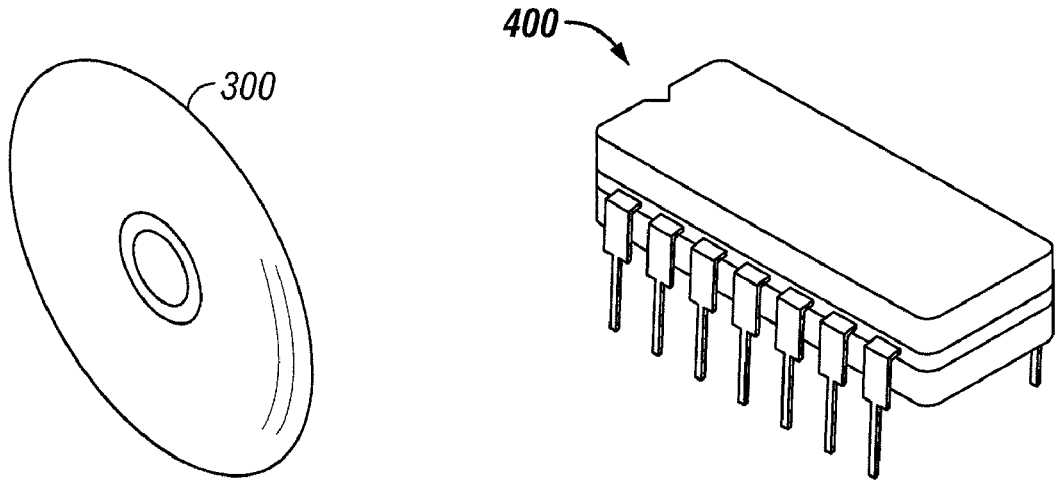
FIG. 3  FIG. 4

*FIG. 7A*  *FIG. 7B*

 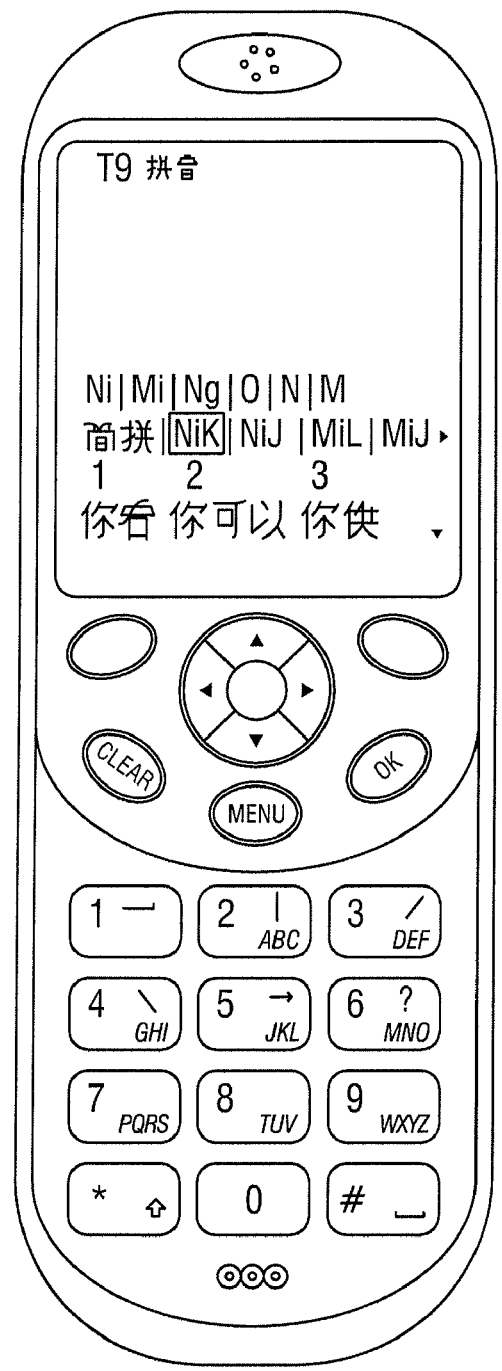
FIG. 7C  FIG. 7D

*FIG. 7G*     *FIG. 7H*

*FIG. 7I*   *FIG. 7J*

 
FIG. 7K  FIG. 7L

 
*FIG. 7M*     *FIG. 7N*

*FIG. 7O*        *FIG. 7P*

FIG. 7Q  FIG. 7R

*FIG. 7S*  *FIG. 7T*

 
*FIG. 7U*  *FIG. 7V*

| 804 | 806 | 808 |
|---|---|---|
| T9 拼音<br><br>◂6\|[O]\|N\|M<br>1 2 3 4 5 6 7<br>噢 噯 喔 欧 偶 藕 区 ▾ | T9 拼音<br><br>◂64\|简拼\|[Ni]\|Mi\|Ng<br>1 2 3 4 5 6 7<br>你 呢 尼 泥 逆 拟 腻 ▾ | T9 拼音<br><br>◂64\|简拼\|[NiK]\|NiJ\|MiL▸<br>1 2 3<br>你石 你可以 你快 ▾ |
| Enter 6 | Enter 64 | Enter 645 |

| 810 | 812 | 814 |
|---|---|---|
| T9 拼音<br><br>◂6454\|[MiJi]\|MiLi\|NiJi▸<br>1 2 3<br>密集 秘技 秘笈 | T9 拼音<br><br>◂...546\|[NiJin]<br>1 2<br>你今晚 逆境 | T9 拼音<br><br>◂[.468]<br>1<br>645468 |
| Enter 6454 | Enter 64546 | Enter 645468 |

DISAMBIGUATION OF TELEPHONE STYLE KEY PRESSES TO YIELD CHINESE TEXT USING SEGMENTATION AND SELECTIVE SHIFTING

CROSS-REFERENCE TO RELATED APPLICATIONS

This application claims the benefit of the following earlier-filed U.S. Provisional Application in accordance 35 USC 119: "In-lining Editing of Phrasal Text," Application Ser. No. 60/896,464, filed on Mar. 22, 2007 in the names of Wu and Lai. The entirety of the foregoing application is hereby incorporated herein by reference.

BACKGROUND OF THE INVENTION

1. Field of the Invention

The present invention relates to user entry of Chinese text into a computer by way of entering phonetic spelling. More particularly, the invention concerns disambiguation of telephone style key presses to yield Chinese text using segmentation and selective shifting.

2. Description of the Related Art

Chinese characters are notoriously difficult to enter using a computer. One reason is that there are thousands and thousands of characters, and it is impractical to use a keyboard with so many keys. Other approaches have been aimed at having users enter Chinese characters according to the characters' pronunciation. One advantage here is that people can use an alphabet, such as a Latin alphabet. Another approach is to assign each Chinese character a different numeric encoding, and then people can specify characters by the corresponding numbers. Other approaches define characters by their strokes and other structural components, and seek user input on this basis. There are also translation based systems, where people enter characters by entering their equivalent in a different language, which is based on an alphabet, and therefore is more amenable to computer entry. Ultimately, the computer translates from this language into Chinese text.

Today, computer entry of Chinese characters occurs by a variety of these different methods. No one technique has really taken over, since each has different advantages and drawbacks, and different techniques appeal to people of different backgrounds, regions, education, and experiences.

All solutions are constrained by the limitations of hardware, such as the nature of the user entry mechanism, the display, and the processor. On the subject of processing resources, some approaches may theoretically provide character entry schemes that users would find to be more accurate or intuitive, but these often require greater computer processing effort, which slows the overall process and therefore decreases user satisfaction.

Over the years, this area of technology has undergone widespread attention and experienced some significant developments. Nevertheless, much work remains to be done, and further advances in the performance and efficiency of these systems remain to be seen. Indeed, known systems are not always completely adequate for some applications due to certain unsolved problems.

SUMMARY OF THE INVENTION

To enter Chinese text, a user enters the corresponding phonetic spelling via telephone style keypad. Some or all keys represent multiple phonetic letters. In disambiguating entered key presses to yield a valid phonetic spelling, a computer divides the key presses into segments, while still preserving key press order. Each segment must correspond to an entry in a dictionary of Chinese characters, character phrases, and/or character components such as radicals or other predetermined stroke groupings. Upon arrival of a new key press that cannot form a valid entry when appended to the current segment, key presses are incrementally reallocated from the previous segment. As for already-resolved segments occurring prior to the previous and current segments, these are left intact. After each shifting attempt, the computer reinterprets key presses of the last two segments, and accepts the new segmentation if the segments form valid dictionary entries.

The teachings of this disclosure may be implemented as a method, apparatus, logic circuit, storage medium, or a combination of these. This disclosure provides a number of other advantages and benefits, which should be apparent from the following description.

BRIEF DESCRIPTION OF THE DRAWINGS

FIG. 2 is a block diagram of a digital data processing machine.

FIG. 3 shows an exemplary storage medium.

FIG. 4 is a perspective view of exemplary logic circuitry.

FIG. 8 is a diagram showing exemplary screen shots of a different approach than FIGS. 5A-5B.

DETAILED DESCRIPTION

The nature, objectives, and advantages of the invention will become more apparent to those skilled in the art after considering the following detailed description in connection with the accompanying drawings.

For ease of reading, most of this disclosure is explained in terms of Pinyin spellings of Chinese characters. This helps to provide some concrete examples, and formulate a more straightforward explanation of the related concepts. However, the disclosure is not limited to Pinyin, and any scheme for using phonetic spelling (Latin or otherwise) to write Chinese characters may be used. These spellings may be based on Latin or other alphabets, or components unrelated to alphabets. One such example is Bopomofo. Some other examples, to name a few, include EFEO, Gwoyeu Romatzyh, Yale, Wade, S. S. Wong, Jyutping. There are many, many more.

Hardware Components & Interconnections

Overall Structure

Figure 1A:
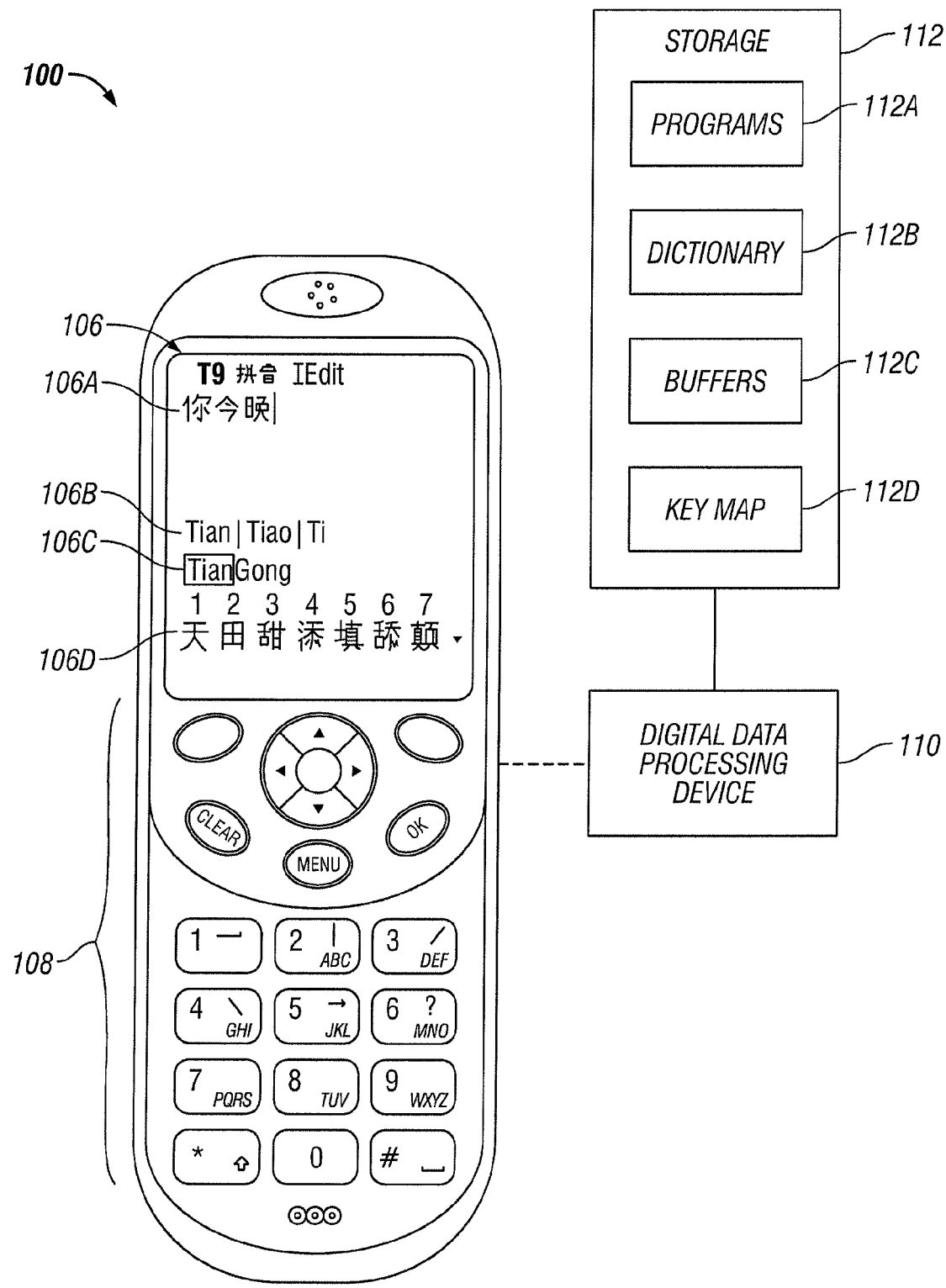
FIG. 1A is a block diagram of the components and interconnections of a text entry computing apparatus.

One aspect of the present disclosure concerns a computer driven Chinese character entry system. This system may be embodied by various hardware components and interconnections, with one example being described by the system 100 of FIG. 1A. With reference to FIG. 1A, the system 100 includes a display 106, data entry tool 108, digital data processing device 110, and storage 112.

Display

In one example, the display 106 comprises a relatively small LCD display of a PDA. However, the display 106 may be implemented by another size or configuration of LCD display, CRT, plasma display, or any other device receiving a machine-readable input signal and providing a human-readable visual output. Instead of a PDA, the display 106 may be implemented in a cell phone, pager, portable computer, personal computer, laptop computer, computer workstation, GPS, automobile console, or any other computer driven machine for which use entry of Chinese may provide utility.

Broadly, as the user enters key presses, the system interprets the key presses as phonetic letters (Pinyin text in this example), and presents a proposed interpretation (Pinyin text) in a collection buffer 106c. The first segment in the collection buffer 106c is highlighted, and a character line 106d presents Chinese text items that represent this segment, such as Chinese characters, character phrases or sets, or components of characters such as radicals or other stroke groupings. These are henceforth referred to as "characters" for shorthand, and ease of description. In case the system's proposal for the first segment is incorrect, the system gives various alternatives to the first (highlighted) segment in a first-segment-alternatives-list 106b. Further below is a detailed explanation of segments and how they are constructed and manipulated.

Ultimately, when the user selects one of the Chinese characters from the character line 106d, the system adds the selected character to an output buffer 106a. The output buffer contains all Chinese characters that the user has entered so far. The output buffer 106a may serve to collect Chinese characters for ultimately sending in an instant message or email, entering into a word processing document, adding to an address book, or other compatible purpose.

Also occurring when the user selects a character or character set from the character line 106d, the system removes the corresponding (highlighted) segment from the collection buffer 106c, highlights the next segment in the buffer, and changes the first-segment-alternatives-list 106b appropriate to the newly highlighted segment.

The components of the display 106 and their operation are discussed at greater length below.

Data Entry Tool

In the illustrated example, the data entry tool 108 comprises a reduced-set keyboard such as a telephone style keypad. Without any intended limitation, the data entry tool 108 is henceforth referred to as a "keypad." The keypad includes multiple keys. Some of the keys represent one or more phonetic letters. In the illustrated example, some of the keys represent three letters, and other keys represent four letters.

The keypad may be provided by a set of mechanical keys, electromechanical keys, or other technology. Another example utilizes on-screen keys depicted, with user input sensed by touch screen, digitizing pad, or other sensing mechanism. In this case, the display 102 and keypad 108 are actually co-located.

As part of the keypad or as an additional feature, the tool 108 may include user input mechanisms to scroll, indicate up/down/left/right directions, indicate OK, clear, activate a menu, send/receive, etc.

Storage

In one example, the storage 112 comprises micro-sized flash memory of the type used in compact applications such as PDAs. However, the storage 108 may be implemented by a variety of hardware such as those discussed below under the heading "storage media." As to the structure of this data, components in the storage 108 may be implemented by linked lists, lookup tables, relational databases, or any other useful data structure. As illustrated, the storage 112 includes certain subcomponents, namely, programs 112a, one or more dictionaries 112b, one or more buffers 112c, and a key mapping 112d.

Storage: Programs

The programs 112a define the operational features of the system 100, and may include firmware, software, machine instructions, circuit elements, integrated circuits, or other implementation.

Storage: Dictionary

In the present example, a single dictionary 112b is illustrated, although multiple dictionaries may be employed. If multiple dictionaries are used, then multiple dictionaries may be used concurrently, or a single dictionary selected based on user choice, application program, device or application context, etc.

Figure 1B:
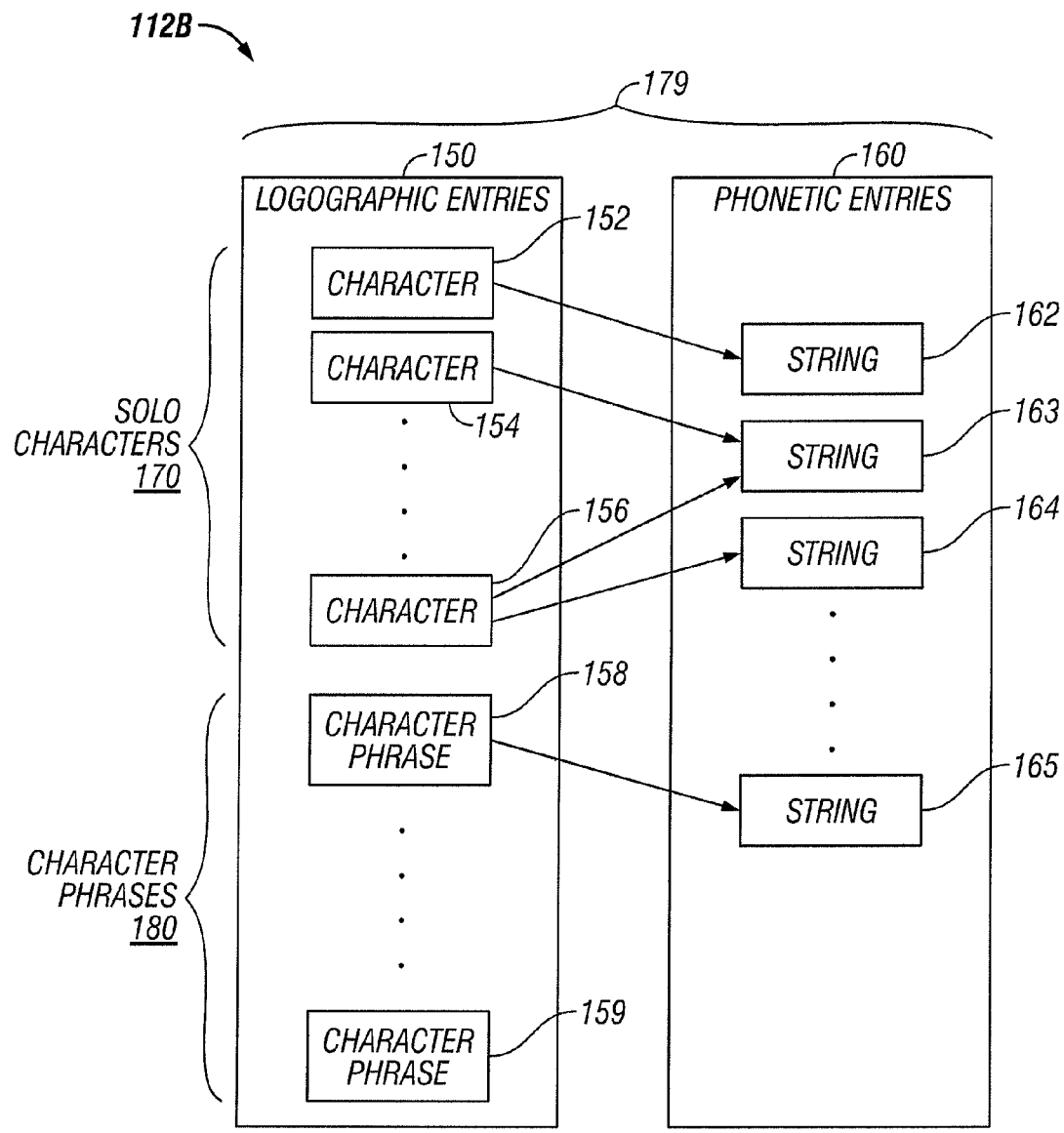
FIG. 1B is a block diagram of a dictionary.

FIG. 1B shows one example of a dictionary. Here, the dictionary 112b includes a number of logographic entries 150, and corresponding various phonetic entries 160. The logographic entries 150 comprise various solo Chinese characters 170 (such as 152, 154, 156, etc) as well as various character sets or "phrases" 180 (such as 158, 159, etc). The entries 150 may further include subcomponents of characters, such as radicals or other stroke groupings. The phonetic entries 160 represent text strings 162-165 (Pinyin text in this example), which correspond to the various entries 150.

Each logographic entry 150 corresponds to one or more phonetic strings 160. For example, a given Chinese character may be represented by 152, and the corresponding phonetic spelling of that character given by 162. In this example, each of the characters 152 or 154 is by one respective string 162 or 163, whereas the character 156 is can be represented by two spellings 163-164.

Some phonetic entries (such as 162) always represent one character (such as 152), whereas other entries (such as 163) may represent different characters (such as 154, 156). The mapping between logographic entries 150 and phonetic entries is shown by 179.

The dictionary 112b may be static, or they it experience changes (as directed by the unit 110) in order to implement experiential learning, software updates, vocabulary changes distributed by a manufacturer or other source, etc. The dictionary 112b may be installed upon the initial manufacture of the device 100, or downloaded or otherwise installed at configuration, boot-up, reconfiguration, initial startup, upgrade, user discretion, etc. The dictionary may undergo self-updating (as directed by the unit 110) to gather new phrases from time to time, by consulting users' previous input, the Internet, wireless network, or another source.

As to content, the dictionary may be taken or derived from various known standards, extracted from corpus, scraped from a search engine, collected from activity of a specific user, etc.

Optionally, the dictionary 112b may further include data (not shown) regarding popularity, such as usage frequency of the characters or phrases. This data may be contained in the dictionary or stated elsewhere with appropriate links to the related entities 150 and/or 160 in the dictionary 112b. In one embodiment, the usage frequency is stated in a linguistic model (not shown), which broadly indicates general or user-specific usage frequency of phonetic entries relative to other phonetic entries, or another indication of the probability that the user intends to select that phonetic entry next. Frequency may be determined by the number of occurrences of the entry in written text or in conversation; by the grammar of the surrounding sentence; by its occurrence following the preceding character or characters; by the context in which the system is currently being used, such as typing names into a phonebook application; by its repeated or recent use in the system (the user's own frequency or that of some other source of text); or by any combination thereof. In another embodiment, usage frequency is based on the usage of entries by a particular user, or in a particular context, such as a message or article being composed by the user. In this example, frequently used entries become more likely characters or phrases. The dictionary 11 may include frequency data based on the phonetic entries, logographic entries 150, or both.

Storage: Buffers

Broadly, the buffers 112c are temporary storage used to accumulate and display user input. One buffer component (not separately shown), for example, stores a representation of each user-entered key press that has been entered via the keypad 108. Other buffer components may be used to store downstream interpretations of the user input, conducted according to installed dictionaries 112b. In this regard, the output buffer 106a, first-segment-alternatives-list 106b, collection buffer 106c, and character line 106b may be considered part of the buffers 112c. And, although it is understood that the components 106a-106d include a storage component, these will be henceforth illustrated in the context of the display 106 for ease of discussion.

Storage: Key Map

The key map 112d indicates which symbols are assigned to which keys of the keypad 108. Depending upon the intended utility, the map 112d may contain a mapping of alphabetic letters, non-alphabetic phonetic letters, numerals, symbols, punctuation, and other input to the keypad keys. Optionally, different mappings may be used according to contexts, application, user-selection, etc.

An exemplary mapping appears in TABLE 1 (below). This mapping is applied for user entry of Indo-European language words, as well as entry of Pinyin, romaji, or other phonetic representations of logographic characters.

TABLE 1

Exemplary Key Map

| 1 | 2 | 3 |
|---|---|---|
|   | ABC | DEF |
| 4 | 5 | 6 |
| GHI | JKL | MNO |
| 7 | 8 | 9 |
| PQRS | TUV | WXYZ |
|   | 0 |   |

As demonstrated by TABLE 1, the map 112 is produces inherently ambiguous results when used to enter phonetic letters, since multiple letters are always assigned to the same key. Namely, user-entered key presses are inherently ambiguous in that they could represent different combinations of intended letters, depending upon which key representation was intended for each key press.

In the following discussion, in order to identify key presses unambiguously, short hand reference is made to the numeral on the key. For instance, a "2" entry denotes the "two" key for shorthand, which is assumed to be the key with A or B or C in this example, even though the numeral itself may be irrelevant to the discussion.

Processor

One example of the digital data processing device 110 is a digital data processing entity of the type utilized in PDAs, cell phones, or other handheld computers. However, in a more general sense, the function of the processor 110 may be implemented by one or more hardware devices, software devices, a portion of one or more hardware or software devices, or a combination of the foregoing without limitation. The makeup of these subcomponents is described in greater detail below, with reference to FIGS. 2-4. For brevity and ease of use, the digital data processing device 110 will be referred to as a "processor," without any intended limitation.

Exemplary Digital Data Processing Apparatus

As mentioned above, data processing entities (such as the processor 110) may be implemented in various forms.

Some examples include a general purpose processor, digital signal processor (DSP), application specific integrated circuit (ASIC), field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

As a more specific example, FIG. 2 shows a digital data processing apparatus 200. The apparatus 200 includes a processor 202, such as a microprocessor, personal computer, workstation, controller, microcontroller, state machine, or other processing machine, coupled to digital data storage 204. In the present example, the storage 204 includes a fast-access storage 206, as well as nonvolatile storage 208. The fast-access storage 206 may be used, for example, to store the programming instructions executed by the processor 202. The storage 206 and 208 may be implemented by various devices, such as those discussed in greater detail in conjunction with FIGS. 3 and 4. Many alternatives are possible. For instance, one of the components 206, 208 may be eliminated; furthermore, the storage 204, 206, and/or 208 may be provided on-board the processor 202, or even provided externally to the apparatus 200.

The apparatus 200 also includes an input/output 210, such as a connector, line, bus, cable, buffer, electromagnetic link, network, modem, transducer, IR port, antenna, or other means for the processor 202 to exchange data with other hardware external to the apparatus 200.

Storage Media

As mentioned above, various instances of digital data storage may be used, for example, to provide storage used by the system 100 (FIG. 1A), to embody the storage 204 and 208 (FIG. 2), etc. Depending upon its application, this digital data storage may be used for various functions, such as storing data, or to store machine-readable instructions. These instructions may themselves aid in carrying out various processing functions, or they may serve to install a software program upon a computer, where such software program is then executable to perform other functions related to this disclosure.

In any case, the storage media may be implemented by nearly any mechanism to digitally store machine-readable signals. One example is optical storage such as CD-ROM, WORM, DVD, digital optical tape, disk storage 300 (FIG. 3), or other optical storage. Another example is direct access storage, such as a conventional "hard drive", redundant array of inexpensive disks ("RAID"), or another direct access storage device ("DASD"). Another example is serial-access storage such as magnetic or optical tape. Still other examples of digital data storage include electronic memory such as ROM, EPROM, flash PROM, EEPROM, memory registers, battery backed-up RAM, etc.

An exemplary storage medium is coupled to a processor so the processor can read information from, and write information to, the storage medium. In the alternative, the storage medium may be integral to the processor. In another example, the processor and the storage medium may reside in an ASIC or other integrated circuit.

Logic Circuitry

In contrast to storage media that contain machine-executable instructions (as described above), a different embodiment uses logic circuitry to implement processing features of the system 100.

Depending upon the particular requirements of the application in the areas of speed, expense, tooling costs, and the like, this logic may be implemented by constructing an application-specific integrated circuit (ASIC) having thousands of tiny integrated transistors. Such an ASIC may be implemented with CMOS, TTL, VLSI, or another suitable construction. Other alternatives include a digital signal processing chip (DSP), discrete circuitry (such as resistors, capacitors, diodes, inductors, and transistors), field programmable gate array (FPGA), programmable logic array (PLA), programmable logic device (PLD), and the like.

FIG. 4 shows an example of logic circuitry in the form of an integrated circuit 400.

Operation

Having described the structural features of the present disclosure, the operational aspect of the disclosure will now be described. The steps of any method, process, or algorithm described in connection with the embodiments disclosed herein may be embodied directly in hardware, in a software module executed by hardware, or in a combination of the two.

Overall Sequence of Operation

Figure 5A:
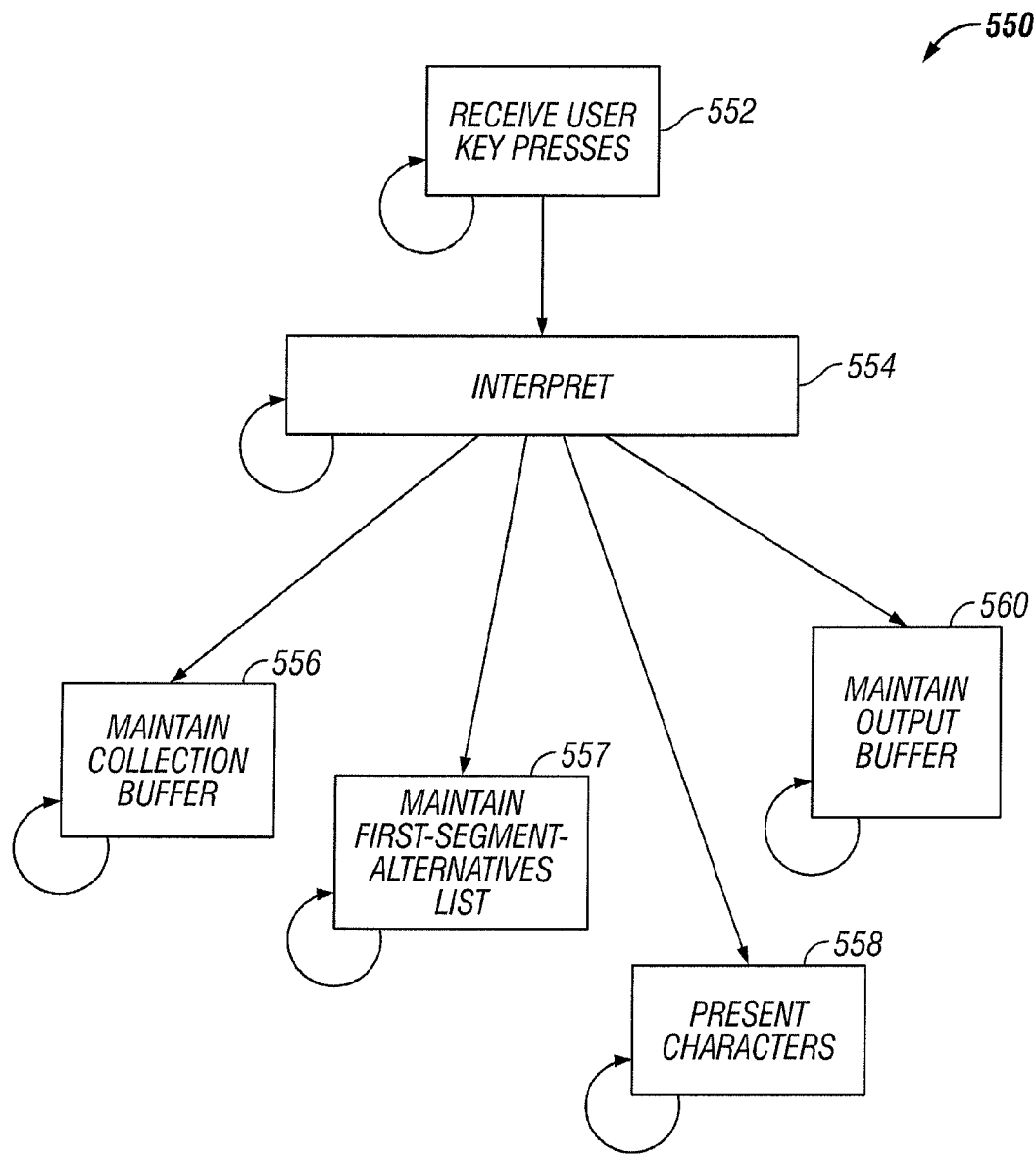
FIG. 5A-5B are flowcharts of operational sequences for disambiguating telephone style key presses to yield Chinese text using segmentation and selective shifting.

FIG. 5A shows an overall operating sequence 550 to facilitate user entry of Chinese text via a computing device. For ease of explanation, but without any intended limitation, the example of FIG. 5A is described in the specific context of the system 100 described above.

In step 552, the system 100 receives user key presses. The key presses represent a corresponding series of phonetic letters collectively spelling out Chinese text, Again, Pinyin provides a helpful example, but this disclosure is not limited to Pinyin. The key presses are inherently ambiguous because, according to the key map 112*d*, each of the phonetic letters shares the same key with other letters.

In step 554, the processor 110 interprets the user-entered key presses to identify any valid spellings of entries 160 in the dictionary 112*b*. In disambiguating entered key presses to yield possible spellings of entries 160, the processor 110 divides the key presses into groups called segments, while still preserving key press order. Each segment must correspond to one of the predefined entries 160 in the dictionary 112*b*, which maps to one or more Chinese characters, character sets, or stroke groupings.

Upon arrival of a new key press that cannot form a valid entry when added to the final (current) segment, the processor in 554 tries incrementally shifting key presses allocated to the previous segment to the current segment ending with the newly entered key press. Accordingly, the division between the last two segments is subject to change. As for already-resolved segments, occurring prior to the two key-press-shifting participants, the processor leaves these intact. After each shifting attempt, the computer reinterprets key presses of the last two segments, and accepts the new segmentation if the segments can be interpreted to form valid dictionary entries. These operations are discussed at length further below.

According to the interpretation of step 554, the processor 110 maintains (step 556) a collection buffer listing the series of phonetic entries corresponding to the key presses as currently interpreted. Also, the processor 110 operates the display 106 to present contents of the collection buffer at 106*c*.

In step 557, the processor 110 maintains a first-segment-alternatives list containing some alternative interpretations of the first segment in the collection buffer 556. The processor 110 also operates the display 106 to present contents of the list at 106*b*. The entries in the list 106*b* need not utilize the same number of key presses as the first segment in the collection buffer 106*c*. For instance, if the first segment is "Mi," the list 106*b* may include O or N or M as alternatives. The entries in the list 106*b* are alternatives, in case the first segment (as proposed) is not what the user intended.

In step 558, the processor 110 also presents logographic dictionary entries 150 corresponding to the first segment of the collection buffer 106*c*. As illustrated, the processor 110 presents these characters in the character line 106*d*.

In step 560, the processor 110 maintains and presents the output buffer 106*a* according to user input. The output buffer accumulates the user's ultimate selections of Chinese entries from the character line 106*d*, in order of user selection.

Segments

Segments are described further with reference to FIGS. 6A-6D. When the processor 110 proposes that a given group of key presses form the spelling of an entry 160 (a "recognized" spelling or entry), these key presses are deemed to form a "segment."

Figure 6A:
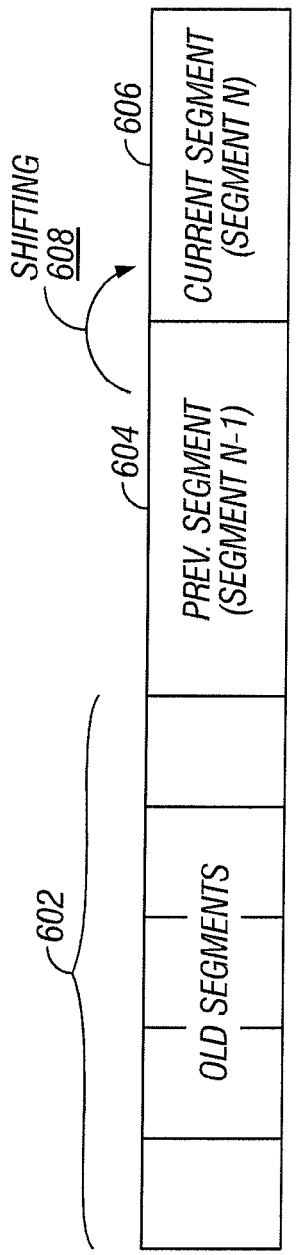
FIGS. 6A-6D are diagrams illustrating some key press segments and related examples.

When the user enters a new key press, the processor 110 attempts to add this key press to the current segment 606. Therefore, the "current" segment is the segment that is currently being built. FIG. 6A depicts the current segment at 606. Sometimes, however, the addition of the new key press to the current segment 606 does not make sense. So, in order to successfully add the new key press to the current segment 606, and still ensure that the current segment 606 corresponds to a recognized entry, the processor 110 considers the effect of shifting 608 one or more key presses from the previous segment 604 to the current segment 606. The "previous" segment 604 is the segment occurring just before the current segment 606, in order of key press entry. The details of shifting 608 are discussed in greater detail below.

As to the older segments 602, namely the segments older than the current and previous segments 606, 604, the processor 110 considers these to be finalized or "established." These are not subject to being disturbed by shifting. This shortcut avoids the technically accurate but computationally demanding task of re-segmenting the entire string of key presses 602, 604, 606. This speeds the overall operation of the system 100 considerably with a minimal accuracy penalty.

Figure 6B:
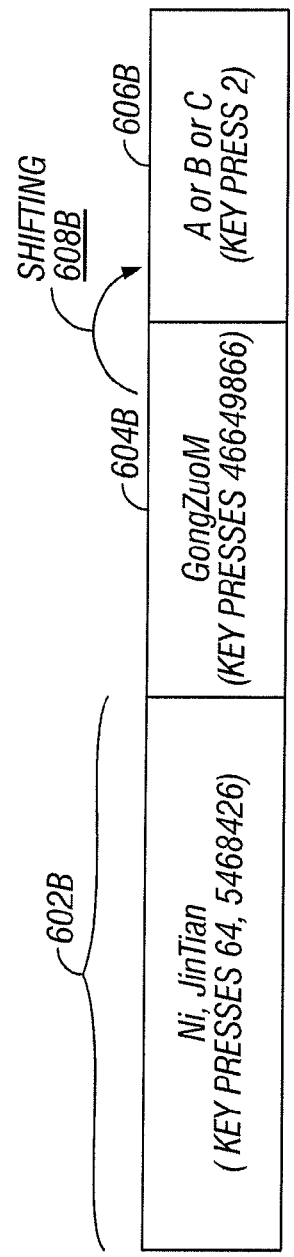
Figure 6C:
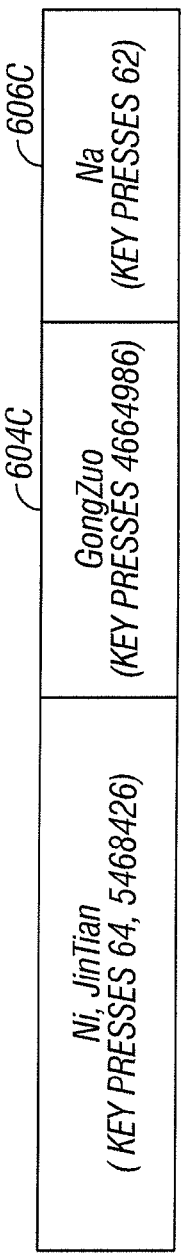

FIG. 6B shows a more detailed example. Here, there are various old segments 602*b*, for which the processor 110 proposed the following interpretation: the segment "Ni" and the segment "JinTian." The processor 110 has interpreted the key presses of the current" segment 604*b* to be "GongZuoM." In FIG. 6B, the user has just added a key press "2," which could be interpreted as an A or B or C. This does not make sense if added on to the current segment 604*b*. So, the new key press is used to form a new segment. This becomes the new current segment (606*b*), and the segment 604*b* becomes the previous segment.

However, before merely interpreting the new key press as the start of a new segment, the processor 110 considers whether shifting key presses from the segment 604*b* (now the "previous" segment since the new segment 606*b* is the "current" segment) would make sense of the new segment 606*b*.

In this example, shifting the trailing "6" key press from the segment 604*b* to the segment 606*b* would produce new segments 604*c* and 606*c* (FIG. 6C), which are both valid according to the dictionary 112*b*. The new segments 604*c*, 606*c* are interpreted as "GongZuo" and "Na," respectively.

Figure 6D:
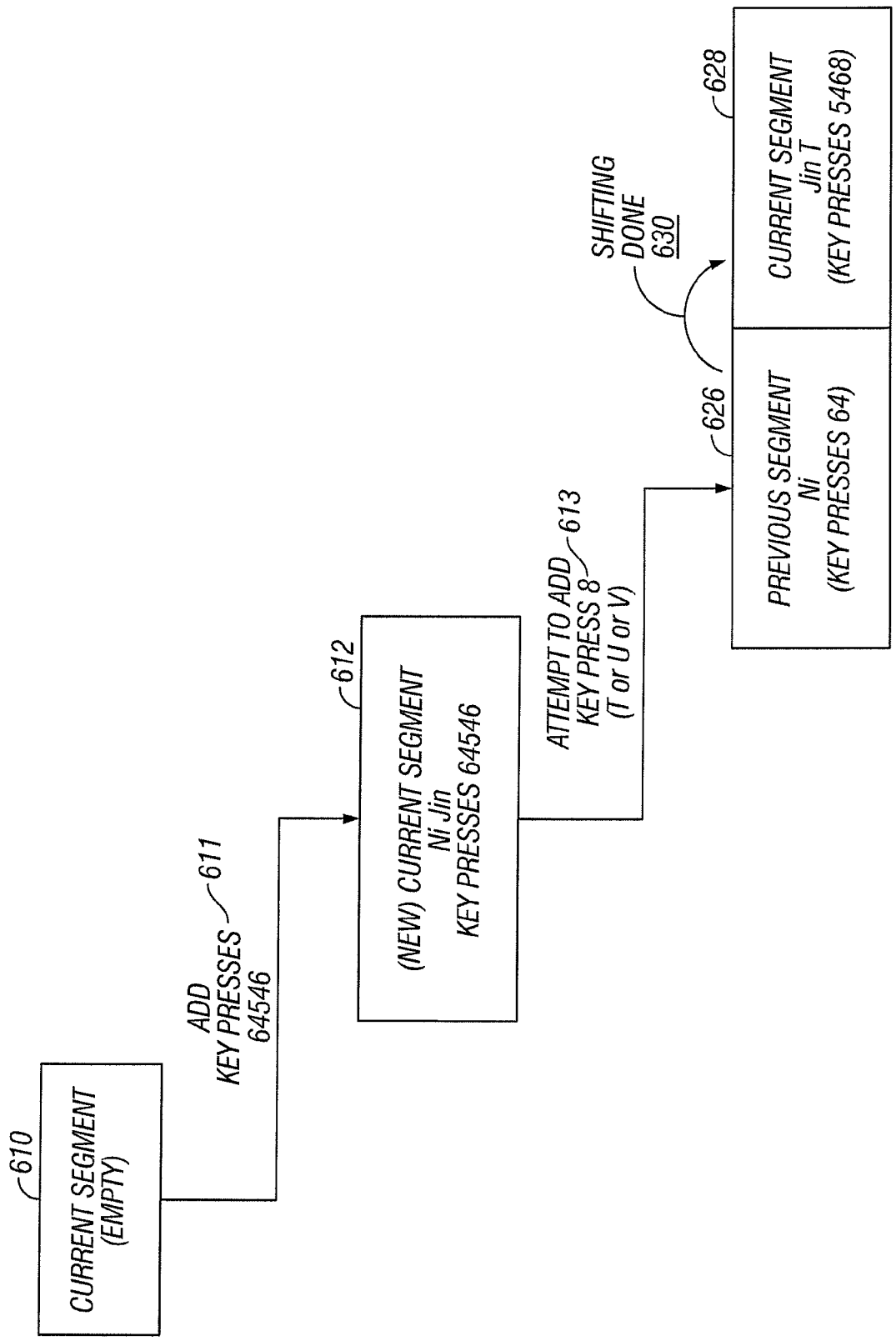

FIG. 6D shows another example. Here, the current segment 610 is empty. This may occur, for example, when the device 100 is activated, or when the user has accepted the contents of the collection buffer into the output buffer. In FIG. 6D, the user adds the key presses "64546," as shown by 612 in the drawing. When the 6 is added, this is valid since it is considered the start of a new segment. When the 4 is added, the segment is construed as "Ni." When the 5 is added, the segment is construed as "NiK." When the 4 is added, the segment is construed as "MiJi." When the 6 is added, the segment is construed as "NiJin."

However, when the user attempts to add a key press "8" (613), this addition to the segment 612 cannot form any valid entries 160 from the dictionary 112. So, the processor creates a new segment (628) for the new key press, and this becomes the current segment. The segment 612 becomes "previous" segment 626. The processor also attempts to shift key presses from the previous segment 626 to the current segment 628 until the current and previous segments 628, 626 form valid entries. In this case, the key presses "546" are shifted from the previous segment 626 to the current segment 628. The shifted key presses "546" added to the leading end of the current segment 628, now form a sequence "5468," which is interpreted a valid dictionary entry "JinT." The previous segment 628 also forms a valid entry, namely, "Ni," representing key presses "64."

Detailed Sequence

Figure 5B:
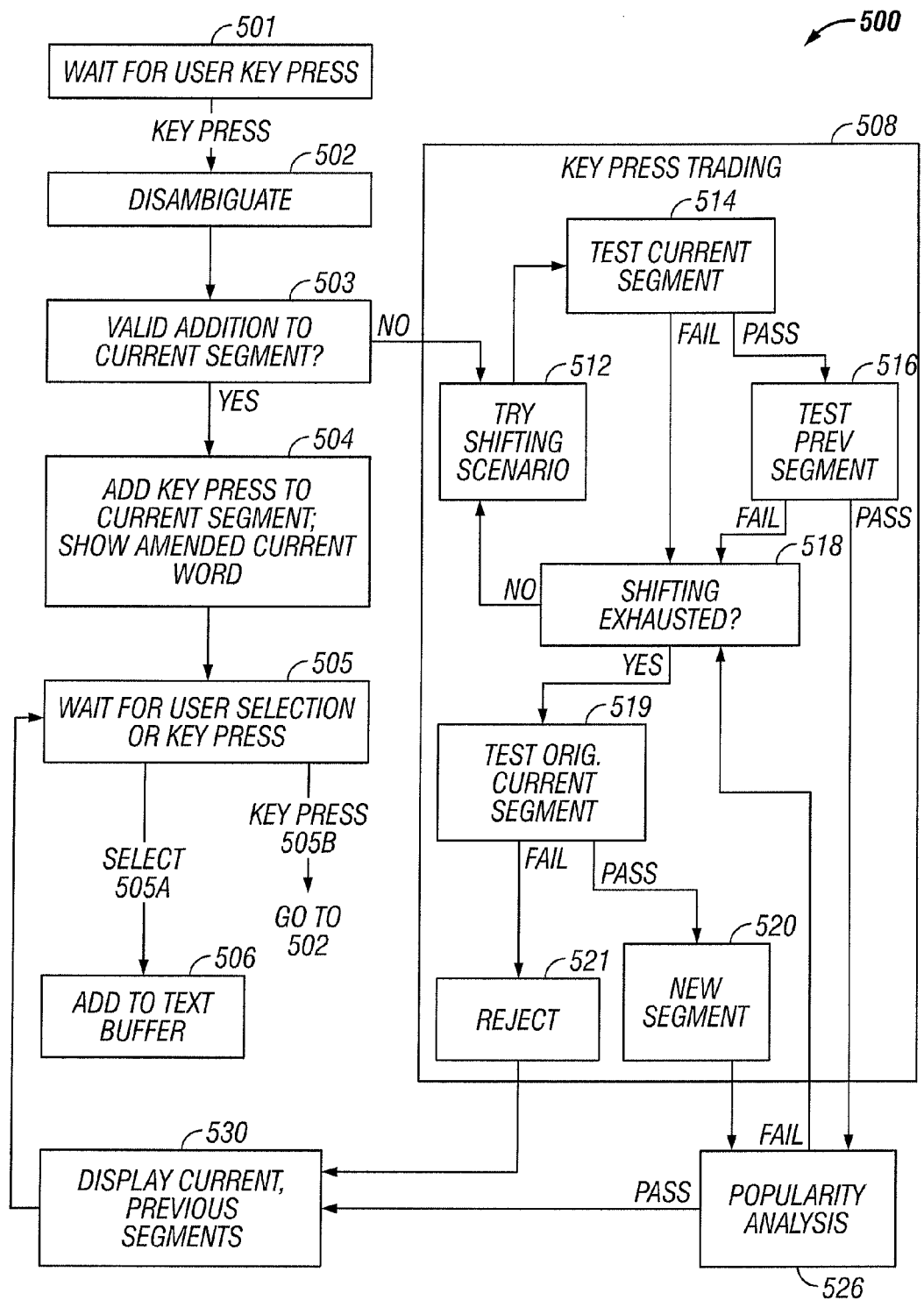

FIG. 5B illustrates some operations of FIG. 5A in more detail. To assist in explaining the flow of FIG. 5B, various references are made to the examples of FIGS. 6A-6D.

User Enters Key Press

In step 501, the system 100 waits for a user key press, and more particularly a key press corresponding to one of the keypad numerals two through nine, since these represent phonetic letters in this example. This keypad arrangement is shown in TABLE 1, which is used in the present example to implement the key map 112*d*. Of course, the processor 110 may respond to the user entering other keys by taking other actions unrelated to the routine 500. However, this discussion is focused on the text entry aspect of the system's operation.

Disambiguate Input and Display Output

Accordingly, when the processor 110 detects an appropriate key press, the routine 500 progresses to step 502. Here, the processor 110 disambiguates the key press. Namely, the processor 110 identifies the letters that the user may have intended. In the example of FIG. 6B, where the new key press is keypad numeral "2," the user might have intended any of the letters A or B or C.

In step 503, the processor 110 determines if any of these letters (from 502) if added to the letters represented by the current "segment" (606 from FIG. 6A), under any possible interpretation, could form a valid dictionary entry 160. If so, the processor 110 preserves the current segmentation and how any existing key presses have been allocated to the various established segments, and adds (step 504) the new key press to the current segment. Also, the processor 110 changes the collection buffer 106*c* to display the new phonetic spelling entry (made from the current segment 606 including the new key press) instead of the previously displayed phonetic entry (made from the current segment without the new key press).

In the case where the added key press forms a segment whose key presses could be disambiguated in several valid ways (forming several entries recognized in the dictionary 112*b*), step 504 decides between the different alternatives, and chooses the best one. This proposed interpretation may be derived according to any suitable criteria, such as frequency of use in general population, frequency or recency of use by the particular user of the system 100, or any other appropriate basis.

If the current segment is the only segment so far (which would be a different example than FIGS. 6B-6C), then the current segment is also the first segment. In this case, the processor 110 presents some of the alternative interpretations for the current segment. These would be shown in the first-segment-alternatives-list 106*b*.

If the current segment is the only segment so far, and the current key press is the only key press so far, then step 503 will consider the key press to be a valid addition to the segment, regardless of which letters the key press represents.

User Makes Selection or Another Key Press

After step 504, step 505 waits for the user to make a selection based on the first segment as proposed (or one of the displayed alternatives from the list 106*b*) in step 505*a*, or to continue spelling by entering another key press in step 505*b*.

In one example, the user would make the selection 505*a* as follows. If the first segment is correct as proposed ("Tian" in the example of FIG. 1A), the user operates a cursor or other selection device to select a desired character from the list 106*b* of characters representing "Tian." Responsive to this selection, the system adds the character to the output buffer 106*a*, and updates the collection buffer 106*c* to remove the selected segment's proposed interpretation and show the next segment's proposed interpretation as the proposed first segment ("Gong" in the example of FIG. 1A). The system also updates the first-segment-alternatives-list 106*b* to display alternatives for "Gong," and updates the character list 106*d* to show Chinese characters representing "Gong."

On the other hand, if the first segment as proposed is incorrect, the user may operate the data entry tool 108 to select one of the alternatives from the list 106*b*. The system 100 then updates the collection buffer 106*c* to show the proposed interpretation of the new first segment. If the new first segment is formed from a different number of key presses than the discarded first segment, the system 100 may re-segment the entire sequence of pending key presses. In one example, this is done step by step, by iteratively performing operations analogous to 508, 526 (discussed below) for each remaining key press that has been entered, in a similar manner as if the key presses accumulated so far were new key presses.

At any rate, the list 106*b* and line 106*d* are also updated according to the (new) first segment's proposed interpretation. Selection and entry of a desired character into the output buffer 106*a* proceeds as described above.

In contrast to the foregoing, if the user, made another key press (505*b*) instead of making a selection (505*a*), the routine 500 returns to step 502 and continues as explained above.

No Valid Addition

The routine 500 proceeds differently if step 503 finds that the current key press (from 501) appended to the trailing end of the current segment 606, when disambiguated, does not form any valid dictionary entries. Namely, step 503 advances to step 508, and attempts some trading of key presses between the current and previous segments. Step 508, which includes substeps 512-520, is described in detail as follows.

Testing & Shifting

First off, step 508 tries to make sense of the current segment (with the new key press appended to its trailing end) by attempting to shift (step 512) key presses, one by one, from the previous segment to join the current segment. This shifting operation (512) works incrementally, by shifting key presses from the trailing end of the previous segment (e.g., 604*b* of FIG. 6B) to the leading end of the current segment (e.g., 606*b*) until both previous segment (as shifted) and current segment (as shifted) both produce valid dictionary entries 160.

More particularly, step 512 borrows one key press from the trailing end of the previous segment 604*b* and adds it to the leading end of the current segment. Relative order of character entry is not disturbed. Since step 512 limits shifting as between the previous segment and the current segment, segments occurring earlier than the previous segment are not disturbed. As an alternative to this scenario, where shifting is limited to the last two segments, step 512 may be altered to limit shifting to another number of segments, such as three, four, etc. However, limiting shifting to the final two segments helps boost processing speed with minimal sacrifice in the area of accuracy.

After shifting 512, the shifted segments are tested to see if they form valid entries 160. Namely, step 514 tests the current segment by disambiguating it to yield every possible interpretation, and determining if any of these possible interpretations form valid entries 160 according to the dictionary 112*b*. In other words, the processor 110 in step 514 identifies every possible string of letters that could be formed by the current segment, and determines which if any of these spells out a recognized entry 160 according to the dictionary 112*b*. The recognized entries found in step 514 may be considered "possible" interpretations of the current segment.

If step 514 fails, then the routine passes to step 518, discussed below. If step 514 passes, then step 516 is performed. Step 516 tests the previous segment in the same was as step 514. If the previous segment passes step 516, then step 526 is performed, as discussed below. But if step 516 fails, then step 516 goes to step 518, which is discussed below.

Shifting Exhausted

Step 518, performed after a failure of step 514 or step 516, asks if shifting operations are exhausted. Shifting operations are exhausted when all possible shifts between previous/current segments have been tried without succeeding. Although shifting may be performed in either or both directions, the present example is discussed in the direction from previous to current segment.

If step 518 finds that shifting has been exhausted, then the current and previous segments do not form valid dictionary entries in their initial state (as of the departure from step 503, right when the new key press is first added to the current segment) or after any of the possible shifting scenarios of step 512. In other words, the shifting operation 512 failed to come up with a strategy of shifting key presses from the previous segment to the current segment in order to arrive at valid segments.

Accordingly, step 518 proceeds to step 519. Step 519 tests the validity of the current segment, before addition of the new key press, against the dictionary 160. The theory here is that the new key press might be allowable as its own segment, as long as the current segment (as of 503) would still be valid. Accordingly, if step 519 finds that the current segment (minus the new key press) is valid against the dictionary 160, then step 519 goes to step 520. Step 520 retains the new key press by un-doing all of the shifting from step 512 and making the new key press into its own segment. Going forward, the effect of this operation is to rename the current segment (minus the new key press) as the "previous" segment, and make the new key press by itself into the "current" segment. Regardless of whether the new key press by itself forms a valid dictionary 160 entry, the new key press is being allowed in order to permit the user to begin a new phonetic spelling entry. After step 520, the program goes to step 526, which is discussed below.

In contrast to the foregoing, if the current segment (minus the new key press) is not valid by itself, then the new key press cannot be allowed. In this case, the key press does not assist the current segment become a valid segment on its own, either by itself or with shifted key presses from the previous segment. Consequently, step 521 rejects the new key press. The system 100 may, for example, present a rejection message or cause another appropriate error condition. As of completion of step 521, the current/previous segments are now the same as they were when step 503 finished, before step 508 began. Step 521 then proceeds to step 530, discussed below.

Frequency Analysis

After a passing result from steps 514/516, the routine 500 performs popularity analysis in step 526. Broadly stated, this takes step 508's all possible interpretations of the previous segment (as shifted) and current segment plus new key press (as shifted) found in steps 514, 516, and tests them against predetermined popularity criteria. The best interpretations for current and previous segment, under this analysis, become the system's proposed interpretations.

The terms "popularity" and "frequency" are used loosely and solely for the sake of convenience, since this operation includes a variety of criteria as discussed below. As an example, step 526 may require each proposed interpretation of a segment to meet a prescribed threshold as to historical use, such as frequency-of-use, recency-of-use, etc. This may be determined with reference to the system operator particularly, or according to the population at large, population of a nation or region, population of speakers of a language or dialect, etc.

If one or both of the proposed interpretations fail, then step 526 returns to step 518, which was discussed above. On the other hand, if both proposed segments pass step 526, then the process 500 advances to step 530, discussed below.

Step 526 may performed in this way, or by a number of alternatives. In one example, the analysis of step 526 may be incorporated into steps 514, 516. Here, if the frequency analysis fails, this causes the test (514 or 516) to fail. Another alternative is for step 512 to always continue shifting until reaching "shifting exhausted" (step 518), regardless of whether the tests 514, 516 pass or fail in order to consider all shifting possibilities and evaluate them against each other. Ultimately, the operation 508 in this example would take the best alternative of all the shifting possibilities based on the current/previous segment combination whose proposed interpretation has the highest demonstrated popularity rating.

As a completely different alternative to popularity analysis, this step 526 may be eliminated entirely. In this example, the tests 514, 516 themselves arrive at the proposed interpretations. Steps 514, 516 may perform this analysis in various ways, such as taking the first interpretation found, taking the alphabetically-first interpretation, etc.

Display New Segments

Step 530 is performed after some shifting occurred or at least was attempted (508), and may be preceded by the frequency analysis of step 526 in some cases. Broadly, step 530 proceeds to present the proposed interpretations (from step 508) of the newly established current and previous segments to the user.

In one scenario, these current and previous segments may be the respective segments as successfully and finally shifted by step 512. Here, step 530 presents the proposed interpretations of the newly established current and previous segments.

In another scenario, where shifting failed to produce a valid output, and the current segment failed the test of step 519, the current and previous segments will be the same respective segments as was the case when commencing step 508 (and leaving step 503). In this case, step 530 takes the new key press rejected in step 521 and removes it from the display, in effect resuming the display as of the time before the new key press was added.

Some Benefits of Present Approach

The present approach, as exemplified in FIGS. 5A-5B, provides a number of advantages. Without trying to be comprehensive in listing them, the following discussion addresses a few advantages, in comparison to another approach that could conceivably be used.

As recognized by the inventors, a "brute force" approach might be to consider all of the user's accumulated key presses as a group, and to comprehensively disambiguate the group as a whole. This would consider entirety of all entries that could possibly be represented by the key presses, and all of the various segmentations. Although completely accurate, this approach is limited by the processing capability of today's portable computers. Thus, the brute force approach would be time consuming to perform, and may not completely satisfy the fast pace demanded by today's computer users.

In contrast, the present approach tags a new key press onto the end of a current segment, if possible. This approach even considers borrowing trailing key presses away from the previous segment for inclusion with the current segment and new key press, in order to make sense of the current key press. However, this approach does not disturb segments occurring before the current and previous segments. In this sense, the present approach strikes an efficient balance between manipulating existing key presses to make sense of a new key press, and avoiding reinterpreting the entire string of user entered key presses.

FIG. 8 shows a series 800 of screen shots, showing the inventors conception of how the brute force approach could be implemented. In a screen 804, the user makes a key press "6." The device interprets this as either a numerical entry "6," or any of the letters "O" or "N" or "M." In a screen 806, the user adds a "4" key press. The device interprets the accumulated key press combination as the number "64," or any of the Pinyin entries "Ni" or "Mi" or "Ng." In a screen 808, the user adds a "5." The device interprets the series of user-entered key presses as the number "645," or the Pinyin entries "NiK" or "NiJ" or "MiL" among others. In a screen 810, the user adds a "4." The device interprets the series of key presses (so far) as the number "6454," or the Pinyin entries "MiJi" or "MiLi" or "NiJi" among others. In a screen 812, the user adds a "6." The device interprets the series of key presses, so far, as the number "64546," or the Pinyin entry "NiJin." In a screen 814, the user adds a key press "8." At this point, the accumulated key presses do not have any interpretations that match any the dictionary. So, the system breaks down, and the device merely renders a numeric interpretation ("645468").

In contrast to FIG. 8, the present approach would not eventually reduce to numerical entry in the screen 814, regardless of whether the series of key presses as a whole has any available interpretations found in the dictionary. In particular, having established that the first two key presses "64" represent "Ni," the next key presses "546" providing the current entry "Jin" would be subject to key press shifting. Namely, the "6" could be shifted to the new key press "8" so that the last Pinyin entry would be "Ji" and the new entry "Nv." Even if shifting would not produce an acceptable interpretation (as it did here), the present approach would still accommodates the start of a segment with the new key press "8," leaving "Jin" intact.

Thus, the present approach provides a more intuitive result because, among other reasons, it does not continually subject the entire key press sequence as a whole to a phrase dictionary, and also because it permits character shifting between selected segments.

Detailed Example

Figure 7E:
FIGS. 7A-7W are diagrams showing exemplary screen shots of an exemplary interactive sequence performed according to the process of FIG. 5B.
Figure 7F:
Figure 7W:

FIGS. 7A-7W illustrate changes in the display 106 during user entry of the intended Pinyin phrase "NiJinTianGong-ZuoMangMa," by submitting the following exemplary sequence of corresponding key presses: "64546842646649866226462." In these drawings, the display 106, output buffer 106a, first-segment-alternatives-list 106b, collection buffer 106c, and character line 106d are shown in the same relative positions as described in FIG. 1A, without need for further explanation and identification by reference number and other under complication in the illustration.

FIG. 7A shows the display before entry of any key presses. For convenience of the user, the character line 106d displays some of the most common characters, aiding the user in possibly making an initial entry into the output buffer without having to enter any Pinyin at all.

FIG. 7B shows the display after the user enters key press "6." The complete sequence of key presses entered so far is "6." At this point, collection buffer 106d is shown in the form of the highlighted "O," which also forms the proposed first Pinyin entry. TABLE 2 (below) shows the current segmentation, according to key press and proposed interpretation (collection buffer).

TABLE 2

|  | seg 1 | seg 2 | seg 3 | seg 4 | seg 5 | seg 6 | seg 7 |
|---|---|---|---|---|---|---|---|
| key presses | 6 |  |  |  |  |  |  |
| collection buffer | O |  |  |  |  |  |  |

FIG. 7C shows the display after the user adds a key press "4." The complete sequence of key presses entered so far is "64." At this point, the collection buffer 106d appears as a highlighted "Ni," which also forms the proposed interpretation of the first segment. TABLE 3 (below) shows the current segmentation, according to key press and proposed interpretation (collection buffer).

TABLE 3

|  | seg 1 | seg 2 | seg 3 | seg 4 | seg 5 | seg 6 | seg 7 |
|---|---|---|---|---|---|---|---|
| key presses | 64 |  |  |  |  |  |  |
| collection buffer | Ni |  |  |  |  |  |  |

FIG. 7D shows the display after the user adds a key press "5." The complete sequence of key presses entered so far is "645." The collection buffer 106d appears as a highlighted "NiK," which also forms the proposed interpretation of the first segment. TABLE 4 (below) shows the current segmentation.

TABLE 4

|  | seg 1 | seg 2 | seg 3 | seg 4 | seg 5 | seg 6 | seg 7 |
|---|---|---|---|---|---|---|---|
| key presses | 645 | | | | | | |
| collection buffer | Nik | | | | | | |

FIG. 7E shows the display after the user adds a key press "4." The complete sequence of key presses entered so far is "6454." The collection buffer 106*d* appears as a highlighted "MiJi," which also forms the proposed interpretation of the first segment. TABLE 5 (below) shows the current segmentation.

TABLE 5

|  | seg 1 | seg 2 | seg 3 | seg 4 | seg 5 | seg 6 | seg 7 |
|---|---|---|---|---|---|---|---|
| key presses | 6454 | | | | | | |
| collection buffer | MiJi | | | | | | |

FIG. 7F shows the display after the user adds a key press "6." The complete sequence of key presses entered so far is "64546." The collection buffer 106*d* appears as a highlighted "NiJin," which also forms the proposed interpretation of the first segment. TABLE 6 (below) shows the current segmentation.

TABLE 6

|  | seg 1 | seg 2 | seg 3 | seg 4 | seg 5 | seg 6 | seg 7 |
|---|---|---|---|---|---|---|---|
| key presses | 64546 | | | | | | |
| collection buffer | NiJin | | | | | | |

FIG. 7G shows the display after the user adds a key press "8." The complete sequence of key presses entered so far is "645468." The collection buffer 106*d* appears as a highlighted "Ni" plus un-highlighted "NiJv." "Ni" is highlighted because it is the proposed interpretation of the first segment. TABLE 7 (below) shows the current segmentation.

TABLE 7

|  | seg 1 | seg 2 | seg 3 | seg 4 | seg 5 | seg 6 | seg 7 |
|---|---|---|---|---|---|---|---|
| key presses | 64 | 5468 | | | | | |
| collection buffer | Ni | JiNv | | | | | |

FIG. 7H shows the display after the user adds a key press "4." The complete sequence of key presses entered so far is "6454684." In this example, the trailing "546" key presses were shifted from the first segment to the second segment. The collection buffer 106*d* appears as a highlighted "Ni" plus un-highlighted "JinTi." TABLE 8 (below) shows the current segmentation.

TABLE 8

|  | seg 1 | seg 2 | seg 3 | seg 4 | seg 5 | seg 6 | seg 7 |
|---|---|---|---|---|---|---|---|
| key presses | 64 | 54684 | | | | | |
| collection buffer | Ni | JinTi | | | | | |

FIG. 7I shows the display after the user adds a key press "2." The complete sequence of key presses entered so far is "64546842." The collection buffer 106*d* appears as a highlighted "Ni" plus un-highlighted "JinTia." TABLE 9 (below) shows the current segmentation.

TABLE 9

|  | seg 1 | seg 2 | seg 3 | seg 4 | seg 5 | seg 6 | seg 7 |
|---|---|---|---|---|---|---|---|
| key presses | 64 | 546842 | | | | | |
| collection buffer | Ni | JinTia | | | | | |

FIG. 7J shows the display after the user adds a key press "6." The complete sequence of key presses entered so far is "645468426." The collection buffer 106*d* appears as a highlighted "Ni" plus un-highlighted "JinTian." TABLE 10 (below) shows the current segmentation.

TABLE 10

|  | seg 1 | seg 2 | seg 3 | seg 4 | seg 5 | seg 6 | seg 7 |
|---|---|---|---|---|---|---|---|
| key presses | 64 | 5468426 | | | | | |
| collection buffer | Ni | JinTian | | | | | |

FIG. 7K shows the display after the user adds a key press "4." The complete sequence of key presses entered so far is "6454684264." The collection buffer 106*d* appears as a highlighted "Ni" plus un-highlighted "JinTianG." TABLE 11 (below) shows the current segmentation. In this example, the added "G" is proposed as the start of a new segment.

TABLE 11

|  | seg 1 | seg 2 | seg 3 | seg 4 | seg 5 | seg 6 | seg 7 |
|---|---|---|---|---|---|---|---|
| key presses | 64 | 5468426 | 4 | | | | |
| collection buffer | Ni | JinTian | G | | | | |

FIG. 7L shows the display after the user adds a key press "6." The complete sequence of key presses entered so far is "64546842646." The collection buffer 106*d* appears as a highlighted "Ni" plus un-highlighted "JinTianGo." TABLE 12 (below) shows the current segmentation.

TABLE 12

|              | seg 1 | seg 2   | seg 3 | seg 4 | seg 5 | seg 6 | seg 7 |
|--------------|-------|---------|-------|-------|-------|-------|-------|
| key presses  | 64    | 5468426 | 46    |       |       |       |       |
| collection buffer | Ni | JinTian | Go  |       |       |       |       |

FIG. 7M shows the display after the user adds a key press "6." The complete sequence of key presses entered so far is "645468426466." The collection buffer 106*d* appears as a highlighted "Ni" plus un-highlighted "JinTianGon." TABLE 13 (below) shows the current segmentation.

TABLE 13

|              | seg 1 | seg 2   | seg 3 | seg 4 | seg 5 | seg 6 | seg 7 |
|--------------|-------|---------|-------|-------|-------|-------|-------|
| key presses  | 64    | 5468426 | 466   |       |       |       |       |
| collection buffer | Ni | JinTian | Gon |       |       |       |       |

FIG. 7N shows the display after the user adds a key press "4." The complete sequence of key presses entered so far is "6454684264664." The collection buffer 106*d* appears as a highlighted "Ni" plus un-highlighted "JinTianGong." TABLE 14 (below) shows the current segmentation.

TABLE 14

|              | seg 1 | seg 2   | seg 3 | seg 4 | seg 5 | seg 6 | seg 7 |
|--------------|-------|---------|-------|-------|-------|-------|-------|
| key presses  | 64    | 5468426 | 4664  |       |       |       |       |
| collection buffer | Ni | JinTian | Gong |       |       |       |       |

FIG. 7O shows the display after the user adds a key press "9." The complete sequence of key presses entered so far is "64546842646649." The collection buffer 106*d* appears as a highlighted "Ni" plus un-highlighted "JinTianGongZ." TABLE 15 (below) shows the current segmentation.

TABLE 15

|              | seg 1 | seg 2   | seg 3 | seg 4 | seg 5 | seg 6 | seg 7 |
|--------------|-------|---------|-------|-------|-------|-------|-------|
| key presses  | 64    | 5468426 | 46649 |       |       |       |       |
| collection buffer | Ni | JinTian | GongZ |       |       |       |       |

FIG. 7P shows the display after the user adds a key press "8." The complete sequence of key presses entered so far is "645468426466498." The collection buffer 106*d* appears as a highlighted "Ni" plus un-highlighted "JinTianGongWu." TABLE 16 (below) shows the current segmentation.

TABLE 16

|              | seg 1 | seg 2   | seg 3  | seg 4 | seg 5 | seg 6 | seg 7 |
|--------------|-------|---------|--------|-------|-------|-------|-------|
| key presses  | 64    | 5468426 | 466498 |       |       |       |       |
| collection buffer | Ni | JinTian | GongWu |    |       |       |       |

FIG. 7Q shows the display after the user adds a key press "6." The complete sequence of key presses entered so far is "6454684264664986." The collection buffer 106*d* appears as a highlighted "Ni" plus un-highlighted "JinTianGongZuo." TABLE 17 (below) shows the current segmentation.

TABLE 17

|              | seg 1 | seg 2   | seg 3   | seg 4 | seg 5 | seg 6 | seg 7 |
|--------------|-------|---------|---------|-------|-------|-------|-------|
| key presses  | 64    | 5468426 | 4664986 |       |       |       |       |
| collection buffer | Ni | JinTian | GongZuo |    |       |       |       |

FIG. 7R shows the display after the user adds a key press "6." The complete sequence of key presses entered so far is "64546842646649866." The collection buffer 106*d* appears as a highlighted "Ni" plus un-highlighted "JinTianGongZuoM." TABLE 18 (below) shows the current segmentation.

TABLE 18

|              | seg 1 | seg 2   | seg 3    | seg 4 | seg 5 | seg 6 | seg 7 |
|--------------|-------|---------|----------|-------|-------|-------|-------|
| key presses  | 64    | 5468426 | 46649866 |       |       |       |       |
| collection buffer | Ni | JinTian | GongZuoM |   |       |       |       |

FIG. 7S shows the display after the user adds a key press "2." The complete sequence of key presses entered so far is "645468426466498662." In this example, the trailing "6" key press was shifted from the third segment to the fourth segment. The collection buffer 106*d* appears as a highlighted "Ni" plus un-highlighted "JinTianGongZuoNa." TABLE 19 (below) shows the current segmentation.

TABLE 19

|              | seg 1 | seg 2   | seg 3   | seg 4 | seg 5 | seg 6 | seg 7 |
|--------------|-------|---------|---------|-------|-------|-------|-------|
| key presses  | 64    | 5468426 | 4664986 | 62    |       |       |       |
| collection buffer | Ni | JinTian | GongZuo | Na  |       |       |       |

FIG. 7T shows the display after the user adds a key press "2." The complete sequence of key presses entered so far is "645468426466498662." The collection buffer 106*d* appears as a highlighted "Ni" plus un-highlighted "JinTianGongZuoNan." TABLE 20 (below) shows the current segmentation.

TABLE 20

|              | seg 1 | seg 2   | seg 3   | seg 4 | seg 5 | seg 6 | seg 7 |
|--------------|-------|---------|---------|-------|-------|-------|-------|
| key presses  | 64    | 5468426 | 4664986 | 626   |       |       |       |
| collection buffer | Ni | JinTian | GongZuo | Nan |       |       |       |

FIG. 7U shows the display after the user adds a key press "4." The complete sequence of key presses entered so far is "6454684264664986624." The collection buffer 106*d* appears as a highlighted "Ni" plus un-highlighted "JinTianGongZuoMang." TABLE 21 (below) shows the current segmentation.

TABLE 21

|  | seg 1 | seg 2 | seg 3 | seg 4 | seg 5 | seg 6 | seg 7 |
|---|---|---|---|---|---|---|---|
| key presses | 64 | 5468426 | 4664986 | 6264 | | | |
| collection buffer | Ni | JinTian | GongZuo | Mang | | | |

FIG. 7V shows the display after the user adds a key press "6." The complete sequence of key presses entered so far is "645468426466649866246." The collection buffer 106d appears as a highlighted "Ni" plus un-highlighted "JinTianGongZuoMangM." TABLE 22 (below) shows the current segmentation.

TABLE 22

|  | seg 1 | seg 2 | seg 3 | seg 4 | seg 5 | seg 6 | seg 7 |
|---|---|---|---|---|---|---|---|
| key presses | 64 | 5468426 | 4664986 | 62646 | | | |
| collection buffer | Ni | JinTian | GongZuo | MangM | | | |

FIG. 7W shows the display after the user adds a key press "2." The complete sequence of key presses entered so far is "6454684264664498662462." The collection buffer 106d appears as a highlighted "Ni" plus un-highlighted "JinTianGongZuoMangMa." TABLE 23 (below) shows the current segmentation.

TABLE 23

|  | seg 1 | seg 2 | seg 3 | seg 4 | seg 5 | seg 6 | seg 7 |
|---|---|---|---|---|---|---|---|
| key presses | 64 | 5468426 | 4664986 | 626462 | | | |
| collection buffer | Ni | JinTian | GongZuo | MangMa | | | |

One observation about the input sequence "6454684264664498662462" is that the system 100 precisely arrived at the intended Pinyin Phrase ("NiJinTianGongZuoMangMa") by the user's key press entry, and nothing more. To complete the entry, the user only need select the desired Chinese character from the character line 106d for the first highlighted segment ("Ni"), and repeat this for each successive segment JinTian, GongZuo, and MangMa.

In some cases, however, the user might enter some key presses that have a more common interpretation than what the user intended. In this case, the collection buffer will not be entirely correct where the since the system 100 takes the most common interpretation for a segment. In this case, the user proceeds through the proposed interpretation (106c) of the key sequence, in order, using the first-segment-alternatives-list 106b where needed to select any intended entries that do not appear in the collection buffer 106c.

Additional User Interface Features

The present disclosure introduces some important and useful features to Chinese text entry systems. The user interface aspect of the disclosure may be implemented with various additions, different nuances, changes, or alternatives. For example, there are many other alternatives to implement the character line 106d and output buffer 106a, and the interface features for users to navigate, choose, and otherwise employ these items. To this end, the present disclosure incorporates by reference the entire content of the following patent documents:

U.S. patent application Ser. No. 10/631,543, filed Jul. 30, 2003 and entitled SYSTEM AND METHOD FOR DISAMBIGUATING PHONETIC INPUT.

U.S. patent application Ser. No. 10/803,255, filed Mar. 17, 2004 and entitled PHONETIC AND STROKE INPUT METHODS OF CHINESE CHARACTERS AND PHRASES.

U.S. patent application Ser. No. 11/040,911, filed Jan. 21, 2005 and entitled USER INTERFACE AND DATABASE STRUCTURE FOR CHINESE PHRASAL STROKE AND PHONETIC TEXT INPUT.

U.S. patent application Ser. No. 11/464,748, filed Aug. 15, 2006 and entitled SEPARATION OF COMPONENTS AND CHARACTERS IN CHINESE TEXT INPUT.

U.S. patent application Ser. No. 11/614,960 filed Dec. 21, 2006 and entitled PROCESSING OF REDUCED-SET USER INPUT TEXT WITH SELECTED ONE OF MULTIPLE VOCABULARIES AND RESOLUTION MODALITIES.

Other Embodiments

While the foregoing disclosure shows a number of illustrative embodiments, it will be apparent to those skilled in the art that various changes and modifications can be made herein without departing from the scope of the invention as defined by the appended claims. Accordingly, the disclosed embodiment are representative of the subject matter which is broadly contemplated by the present invention, and the scope of the present invention fully encompasses other embodiments which may become obvious to those skilled in the art, and that the scope of the present invention is accordingly to be limited by nothing other than the appended claims.

All structural and functional equivalents to the elements of the above-described embodiments that are known or later come to be known to those of ordinary skill in the art are expressly incorporated herein by reference and are intended to be encompassed by the present claims. Moreover, it is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 USC 112, sixth paragraph, unless the element is expressly recited using the phrase "means for" or, in the case of a method claim, the phrase "step for."

Furthermore, although elements of the invention may be described or claimed in the singular, reference to an element in the singular is not intended to mean "one and only one" unless explicitly so stated, but shall mean "one or more". Additionally, ordinarily skilled artisans will recognize that operational sequences must be set forth in some specific order for the purpose of explanation and claiming, but the present invention contemplates various changes beyond such specific order.

In addition, those of ordinary skill in the relevant art will understand that information and signals may be represented using a variety of different technologies and techniques. For example, any data, instructions, commands, information, signals, bits, symbols, and chips referenced herein may be represented by voltages, currents, electromagnetic waves, magnetic fields or particles, optical fields or particles, other items, or a combination of the foregoing.

Moreover, ordinarily skilled artisans will appreciate that any illustrative logical blocks, modules, circuits, and process steps described herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A process to facilitate user entry of Chinese logographic text via computer having a display and a multi-key keypad, the process comprising operations of:
   the computer receiving user entry of a series of key presses representing a corresponding series of letters collectively spelling-out an intended series of one or more phonetic entries from predetermined dictionary, where each dictionary entry represents a phonetic representation of one or more Chinese characters;
   where the key presses are inherently ambiguous because, according to a predetermined mapping, at least some of the specific keys represent multiple letters;
   during the course of receiving the series of key presses, the computer performing operations comprising:
      interpreting the series of key presses to identify a corresponding series of dictionary entries spelled out by the series of key presses;
      maintaining and displaying a collection buffer containing the series of dictionary entries according to a current interpretation;
      presenting Chinese characters corresponding to at least a first dictionary entry of the collection buffer;
      maintaining and displaying an output buffer accumulating user selections of presented Chinese characters, in order of selection;
      where the key presses whose interpretation formed a final dictionary entry in the collection buffer constitute a current segment, and key presses whose interpretation formed a next-to-last dictionary entry in the collection buffer constitute a previous segment;
      where the interpreting operation includes, in response to each new key press, the computer responding by performing operations as follows:
         the computer identifying all possible strings of letters spelled out by the key presses of the current segment appended by the new key press, and determining which if any identified string forms a recognized entry in the dictionary;
         upon success of the determining operation, changing the final entry in the collection buffer to one of the recognized entries;
         upon failure of the determining operation, shifting key presses one-by-one from the previous segment to the current segment appended by the new key press, and with each shift, performing operations comprising:
            for each of the previous segment as shifted and the current segment appended by the new key press as shifted, performing a test to identify all possible strings of letters spelled out by respective segment, and determining which if any of the identified strings forms a recognized entry in the dictionary;
         performing one of the following:
            as soon as the test determines that letters of the previous segment and the current segment appended by the new key press respectively spell out recognized entries in the dictionary, discontinuing further shifting and revising the collection buffer to present said recognized entries;
            continuing the shifting to exhaust all shifting possibilities, evaluating the recognized entries against a predetermined quality popularity criteria, and for each of the current and previous segments as shifted choosing a recognized entry preferred by the criteria, and revising the collection buffer to preferred entries for the segments.

2. A computer-driven process to facilitate user entry of logographic Chinese text, comprising operations of:
   receiving user entry of an ordered sequence of key presses representing an intended series of letters collectively spelling-out a sequence of one or more entries occurring in a predetermined dictionary, where each dictionary entry represents the phonetic spelling of one or more of the following items according to a predetermined system for phonetically representing logographic Chinese text: a Chinese character, a set of multiple Chinese characters, a radical or other grouping of multiple Character strokes;
   where user intention as to the intended series of letters is ambiguous because some or all of the key presses represent multiple phonetic letters;
   interpreting the sequence of key presses by allocating key presses in the sequence into contiguous segments such that letters of each segment's key presses spell a entry occurring in the dictionary, where a segment being appended by new key presses is a current segment, and where a next-earlier segment to the current segment in the sequence forms a previous segment;
   where the interpreting operation comprises:
      responsive to each new key press, determining whether if the new key press were to be appended to a trailing end of the current segment to form a new segment, letters of key presses of the new segment would by spell out any entries recognized by the dictionary;
      if the determining operation succeeds, presenting an output of one or more of the entries spelled out by the key presses of the new segment, and deeming the new segment to be the current segment;
      if the determining operation fails, appending the new key press to a trailing end of the current segment and attempting to shift key presses from a trailing end of the previous segment to a leading end of the current segment until letters of the key presses of both the current segment and the previous segment spell out respective entries occurring in the dictionary;
      limiting performance of said attempt to shift key presses to the current segment and the previous segment, and leaving intact all segments occurring earlier than the previous segment in the sequence of key presses;

if said attempt to shift key presses succeeds, presenting an output of one or more of said entries spelled out by the key presses of the previous segment as shifted and the current segment as shifted;

presenting an output of logographic Chinese text represented by one or more entries spelled by key presses of the segments into to which the sequence of key presses have been allocated.

3. The process of claim 2, where:

said operation of, if the determining operation succeeds, presenting an output of one or more of the entries spelled out by the key presses of the new segment, further comprises:

if multiple entries are spelled out, evaluating the multiple entries against predetermined criteria as to use history to identify a preferred entry, and limiting the presented output to the preferred entry;

said operation of, if said attempt to shift key presses succeeds, presenting an output of one or more of said entries spelled out by the key presses of the previous segment as shifted and the current segment as shifted, further comprises:

if multiple entries are spelled out, evaluating the multiple entries against predetermined criteria as to use history to identify a preferred entry, and limiting the presented output to the preferred entry.

4. The process of claim 2, where if said attempt to shift fails, rejecting the new key press and reverting the current segment to its contents before being appended by the new key press and undergoing said shifting.

5. The process of claim 2, where if said attempt to reallocate fails, performing operations comprising:

checking whether key presses of the current segment before being appended by the new key press and undergoing said shifting formed any valid entries from the dictionary;

if so, defining as the previous segment the contents of the current segment before being appended by the new key press and undergoing said shifting, and defining as the current segment the new key press alone;

if not, rejecting the new key press and reverting the current segment to its content before being appended by the new key press and undergoing said shifting.

6. The process of claim 2, the attempting shifting comprising:

considering all possible shifts of key presses, and choosing a resulting allocation as between previous segment and current segment that produces spelled out respective entries of highest ranking according to predetermined past criteria as to historical use.

7. The process of claim 2, the attempted shifting comprising:

shifting key presses one-at-a-time until conditions comprising the following are met:

the key presses of both the current segment and the previous segment spell out respective entries recognized by the dictionary; and both of the respective entries satisfy predetermined criteria as to historical use.

8. The process of claim 2, where the operation of limiting performance comprises:

limiting said attempted shifting to the current segment, the previous segment, and one segment preceding the previous segment.

9. The process of claim 2, further comprising:

presenting a collection buffer including, for each segment into which the sequence of key presses has been allocated, a preferred one of said recognized entries spelled out by the key presses of said segment;

only for a first one of the segments in order of the sequence, performing operations comprising:

presenting a selection list including some alternative dictionary entries spelled out by key presses of the first segment;

presenting a list of some logographic Chinese text items phonetically represented by the preferred recognized entry corresponding to the first segment;

responsive to receiving user selection of one of the presented logographic Chinese text items, entering the selected item into a displayed output buffer and removing from the collection buffer the letters corresponding to the first segment;

responsive to receiving user selection of an entry from the selection list, revising the collection buffer to remove the preferred recognized entry for the first segment and to add the selected entry, and revising the list of logographic Chinese text items to present logographic Chinese text items representing the selected entry.

10. The process of claim 9, further comprising identifying the preferred entries by applying predetermined criteria as to historical use.

11. A computer-driven process to facilitate user entry of logographic Chinese text, comprising operations of:

receiving user entry of an ordered sequence of key presses representing an intended series of letters collectively spelling-out a sequence of one or more entries occurring in a predetermined dictionary, where each dictionary entry represents the phonetic spelling of one or more Chinese characters or character sets;

where user intention as to the intended series of letters is ambiguous because some or all of the key presses represent multiple phonetic letters;

interpreting the sequence of key presses by allocating key presses in the sequence into contiguous segments such that letters of each segment's key presses spell a entry occurring in the dictionary, where a segment being appended by new key presses is a current segment, and where a next-earlier segment to the current segment in the sequence forms a previous segment;

where the interpreting operation comprises:

responsive to each new key press, determining the following: if the new key press were to be appended to a trailing end of the current segment to form a new segment, whether letters of key presses of the new segment would by spell out any entries recognized by the dictionary;

if the determining operation succeeds, identifying a preferred one of all entries spelled out by the key presses of the new segment, presenting an output of the preferred entry, and deeming the new segment to be the current segment;

if the determining operation fails, appending the new key press to a trailing end of the current segment and attempting to shift key presses from a trailing end of the previous segment to a leading end of the current segment until letters of the key presses of both the current segment and the previous segment spell out respective entries occurring in the dictionary;

limiting performance of said attempt to shift key presses to the current segment and the previous segment, and leaving intact all segments occurring earlier than the previous segment in the sequence of key presses;

if said attempt to shift key presses succeeds, identifying a preferred one of all entries spelled out by the key presses of the previous segment as shifted, and identifying a preferred one of all entries spelled out by the key presses of the current segment as shifted, and presenting an output of the identified preferred entries;

continually presenting a collection buffer showing, for each segment into which the sequence of key presses have been allocated, a preferred entry identified for that segment.

12. The process of claim 11, further comprising:

only for a first one of the segments in order of the sequence, performing operations comprising:

presenting an alternatives-selection-list including some alternative dictionary entries spelled out by key presses of the first segment;

presenting a list of some logographic Chinese text items phonetically represented by the preferred entry corresponding to the first segment.

13. The process of claim 12, further comprising:

responsive to receiving user selection of one of the presented logographic Chinese text items, entering the selected item into a displayed output buffer and removing from the collection buffer the preferred entry spelled out by key presses of the first segment.

14. The process of claim 12, further comprising:

responsive to receiving user selection of an entry from the alternatives-selection-list, revising the collection buffer to remove the preferred entry spelled out by key presses of the first segment;

revising the list of logographic Chinese text items so as to present logographic Chinese text items representing the use selected entry.

\* \* \* \* \*